(12) United States Patent
Bottemiller et al.

(10) Patent No.: US 7,941,652 B2
(45) Date of Patent: *May 10, 2011

(54) APPARATUS AND COMPUTER PROGRAM PRODUCT FOR IMPLEMENTING ATOMIC DATA TRACING

(75) Inventors: Kraig Allan Bottemiller, Rochester, MN (US); Brent William Jacobs, Rochester, MN (US); James Albert Pieterick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 510 days.

This patent is subject to a terminal disclaimer.

(21) Appl. No.: 12/110,451

(22) Filed: Apr. 28, 2008

(65) Prior Publication Data
US 2008/0201615 A1    Aug. 21, 2008

Related U.S. Application Data

(63) Continuation of application No. 10/659,975, filed on Sep. 11, 2003, now Pat. No. 7,383,428.

(51) Int. Cl.
*G06F 9/00* (2006.01)

(52) U.S. Cl. ........................................................ 712/227
(58) Field of Classification Search .................... None
See application file for complete search history.

(56) References Cited

U.S. PATENT DOCUMENTS

| | | | |
|---|---|---|---|
| 5,226,153 | A | 7/1993 | DeAngelis et al. |
| 6,145,123 | A | 11/2000 | Torrey et al. |
| 6,453,405 | B1 | 9/2002 | Hoyle et al. |
| 6,643,803 | B1 | 11/2003 | Swoboda et al. |
| 7,099,817 | B2 | 8/2006 | Agarwala et al. |

*Primary Examiner* — Robert Fennema
(74) *Attorney, Agent, or Firm* — Joan Pennington

(57) ABSTRACT

A method, apparatus and computer program product are provided for implementing atomic data tracing in a processor system including an auxiliary processor unit (APU) coupled to a central processor unit (CPU). The auxiliary processor unit (APU) processes a trace instruction. When a trace instruction is identified by the APU, the APU signals the CPU with a pipeline stall signal for stalling the CPU and checks for an enabled trace engine as specified by the trace instruction. When the trace engine for the trace instruction is enabled, then the trace data is written into a trace buffer. The APU signals the CPU with an op done signal for allowing the CPU to continue with instruction processing.

8 Claims, 6 Drawing Sheets

APU TRACE INSTRUCTION FORMAT 300

| OP CODE 302 | RS 304 | RA 306 | NB 308 | EXTENDED OP CODE 310 | X 312 |
|---|---|---|---|---|---|

OP CODE 302 - PRIMARY OP CODE FOR THE INSTRUCTION

RS 304 - GENERAL PURPOSE REGISTER (GPR) CONTAINING AN INDEX INDICATING WHICH TRACE ENGINE TO USE.

RA 306 - GPR INDICATING THE FIRST GPR CONTAINING DATA TO BE WRITTEN INTO THE CURRENT TRACE ENTRY.

NB 308 - NUMBER OF BYTES TO BE WRITTEN INTO THE CURRENT TRACE ENTRY. (ALTERNATIVE IMPLEMENTATION)

EXTENDED OP CODE 310 - EXTENDED OP CODE OF THE INSTRUCTION

X 312 - THIS FIELD IS NOT USED

FIG. 3

APPARATUS AND COMPUTER PROGRAM PRODUCT FOR IMPLEMENTING ATOMIC DATA TRACING

This application is a continuation application of Ser. No. 10/659,975 filed on Sep. 11, 2003.

FIELD OF THE INVENTION

The present invention relates generally to the data processing field, and more particularly, relates to a method, apparatus and computer program product for implementing atomic data tracing.

DESCRIPTION OF THE RELATED ART

It is often necessary for firmware to trace information into a buffer to provide a record of activity for later debug. Because tracing usually has no functional benefit, it is debug only, fast execution speed is very desirable and often so is the ability to enable and disable it on the fly. Often it is necessary to write information into one trace buffer from multiple threads of execution or from interrupt level in addition to thread level.

To maintain coherency in the trace buffer the determination of the current trace entry and increment to the next trace entry must appear to be atomic. There are a few different ways for currently achieving this atomic behavior. First would be to mask interrupts and suspend thread dispatching during the atomic update. Another method is to provide a different trace buffer for each of the threads and interrupt levels a function needs to trace from, and then merge these trace buffers together with post processing.

Another method is to use generic processor instructions, such as iwarx and stwcx. in the Power PC instruction set. Some processors support generic instructions for atomic operations. Basic atomic add and modify instructions are not sufficient to handle the trace buffer wrap situation. The PowerPC lwarx and stwax. instructions have the capability to perform the entry update and trace buffer wrap atomically, but require extra overhead to perform the lock checks and retries of the lock typically increase as the amount of tracing increases.

Additionally, special hardware can be built into the memory controller to increase performance, but requires the OS to save extra state during an execution context switch. Additional hardware in the memory controller can provide the performance necessary and update the trace buffer atomically, but since the data to be traced is held in memory controller registers before it is written out, this requires the OS to save these registers in the case of a context switch in case the new context needs to use the trace buffer. This would be beyond what is normally saved by an OS and multiplies if multiple trace engines are supported.

SUMMARY OF THE INVENTION

A principal object of the present invention is to provide a method, apparatus and computer program product for implementing atomic data tracing. Other important objects of the present invention are to provide such method, apparatus and computer program product for implementing atomic data tracing substantially without negative effect and that overcome many of the disadvantages of prior art arrangements.

In brief, a method, apparatus and computer program product are provided for implementing atomic data tracing in a processor system including an auxiliary processor unit (APU) coupled to a central processor unit (CPU). The auxiliary processor unit (APU) processes a trace instruction. When a trace instruction is identified by the APU, the APU signals the CPU with a pipeline stall signal for stalling the CPU and checks that a trace engine specified by the trace instruction is enabled. When the trace engine for the trace instruction is enabled, then the trace data is written into a trace buffer. The ALU signals the CPU with an op done signal for allowing the CPU to continue with instruction processing.

In accordance with features of the invention, a trace engine includes a set of device control registers (DCRs) accessible by the APU, and a trace buffer. A trace instruction includes encoded first and second general purpose registers (GPRs). The first GPR contains an index to the trace engine DCRs and the second GPR indicates a first GPR containing data to be written into a current trace entry in said trace buffer.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 illustrates an exemplary trace instruction format for implementing atomic data tracing in accordance with the preferred embodiment;

DETAILED DESCRIPTION OF THE PREFERRED EMBODIMENTS

Figure 1:
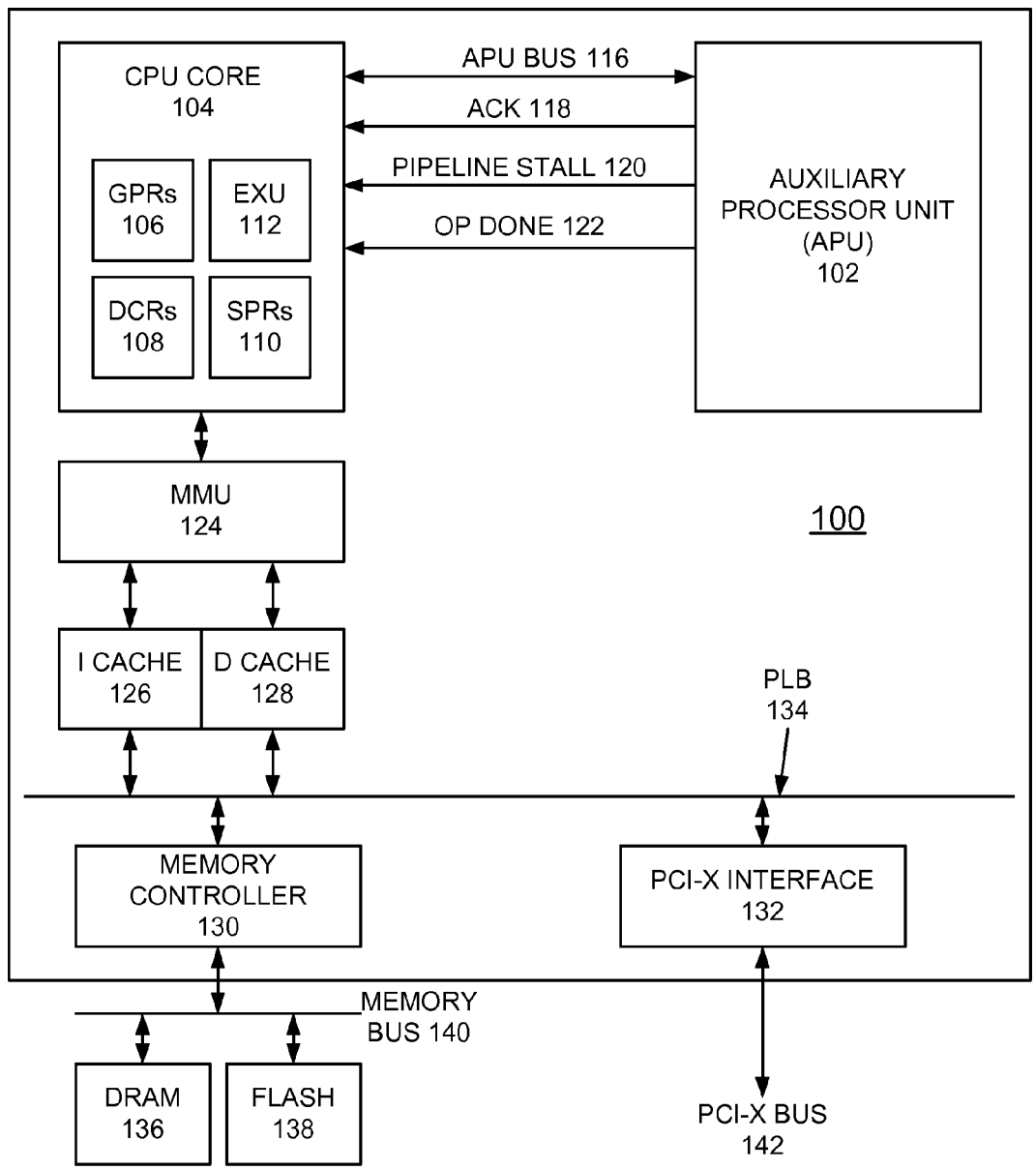
FIG. 1 is a block diagram representation of an exemplary application specific integrated circuit for implementing atomic data tracing in accordance with the preferred embodiment.

Having reference now to the drawings, in FIG. 1, there is shown a processor system in the form of an exemplary application specific integrated circuit (ASIC) generally designated by the reference character 100 for carrying out methods for implementing atomic data tracing of the preferred embodiment. ASIC processor system 100 includes an auxiliary processor unit (APU) 102 and a central processor unit (CPU) core 104 including a plurality of general purpose registers (GPRs) 106, device control registers (DCRs) 108, special purpose registers (SPRs) 110, and an execution unit (EXU) 112. As shown in FIG. 1, APU 102 and the CPU core 104 are coupled together via an APU bus 116 and the APU 102 signals the CPU core 104 through an acknowledge signal 118, a pipeline stall signal 120, and an op done signal 122. ASIC processor system 100 includes a memory management unit (MMU) 124, an instruction cache (I cache) 126 and a data cache (D cache) 128. ASIC processor system 100 includes a memory controller 130 and a PCI-X interface 132 coupled to a processor local bus (PLB) 134. Memory controller 130 is coupled to system memory including a dynamic random access memory (DRAM) 136 and a flash memory 138 via a memory bus 140 and PCI-X interface 132 is coupled to a PCI-X bus 142.

ASIC processor system 100 includes both custom and commercially available or off-the shelf logic entities. For example, the CPU core 104, MMU 124, I cache 126 and D cache 128 are typically part of a logic core that is commercially available or off-the shelf logic entities, for example, manufactured and sold by International Business Machines Corporation. Custom logic, such as memory controller 130, PCI-X interface 132, and APU 102 can be used to create an ASIC processor system 100 that is more specific to a particular application.

CPU core 104 and APU 102 of ASCI processor system 100 can be implemented with various standard processors, for example, with one of the PowerPC® line of processors manufactured by International Business Machines Corporation and APU 102 can be implemented, for example, by an auxiliary processor unit in the PowerPC 405 or PowerPC 440.

The APU 102 can be used to process application specific instructions that are part of a normal instruction stream. This extends the normal instruction set of the CPU core 104. The APU 102 has access to registers in the CPU core 104, such as the GPRs 106, DCRs 108, and SPRs 110, and the capability to load and store data through the MMU 124 and I and D caches 126 and 128 with the help of the CPU core 104. In addition, the APU 102 can provide DCRs 108 beyond what is already provided by the CPU core 104.

ASIC processor system 100 is shown in simplified form sufficient for understanding the present invention. The illustrated ASIC processor system 100 is not intended to imply architectural or functional limitations. The present invention can be used with various hardware implementations and systems and various other internal hardware devices, for example, multiple main processors.

In accordance with features of the preferred embodiment, a trace instruction interpreted by the APU 102 and a set of three additional device control registers accessible by the APU are provided for implementing atomic data tracing. This set of three registers, for example, as illustrated and described with respect to FIG. 2 can be duplicated to create multiple trace engines. An exemplary APU trace instruction 300 is illustrated and described with respect to FIG. 3. When the APU trace instruction is executed, the APU 102 takes information from the processors General Purpose Register (GPRs), indicated in the instruction, to determine what data to write into a trace buffer, and which set of trace engine registers to use. The additional three registers are device control registers used to determine where to write the data into the trace buffer. The APU stalls the instruction stream while the data is written and the trace buffer pointers are being updated, making the instruction atomic.

Figure 2:
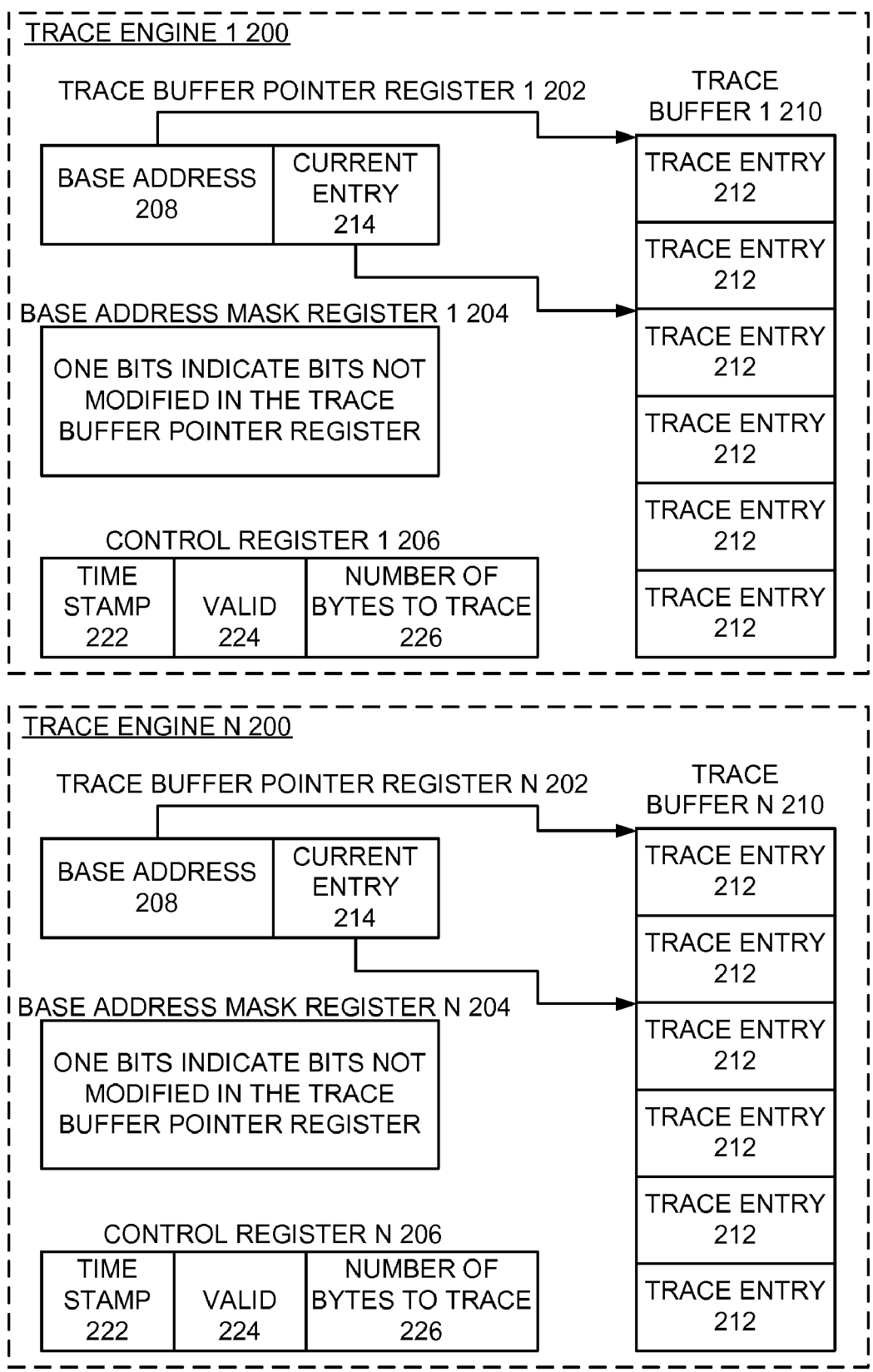
FIG. 2 illustrates a set of device control registers for trace buffer management in accordance with the preferred embodiment.

Referring now to FIG. 2, there is shown a set of device control registers (DCRs) for trace buffer management that defines a trace engine generally designated by reference character 200 in accordance with the preferred embodiment. These three DCRs may be duplicated to create multiple trace engines 1-N, 200. Each set of the Device Control Registers (DCRs) includes a trace buffer pointer register 202, a base address mask register 204, and a control register 206. The trace buffer pointer register 202 indicates a base address 208 of a trace buffer 210 for storing a plurality of trace entries 212 and an offset or current entry 214 of a current trace buffer entry 212. The base address mask register 204 is a mask indicating which bits in the trace buffer pointer register 202 hold the base address and which hold the offset. The base address mask register 204 is used to determine the wrap point of the trace buffer 210 and resetting it back to the beginning. The control register 206 is a control register with a time stamp field 222 indicating whether or not a time stamp should be traced, a valid bit 224 indicating whether or not the trace engine is valid/enabled, allowing trace to be turned on and off on the fly, and a number field 226 indicated the number of bytes to be traced. It should be understood that an alternative to placing the number of bytes to be traced 226 in the control register 206 would be to encode the value in the APU instruction 300.

Referring now to FIG. 3, there is shown an exemplary APU trace instruction format generally designated by reference character 300 for implementing atomic data tracing in accordance with the preferred embodiment. APU trace instruction 300 includes an op code 302 that is a primary op code for the trace instruction. The parameters encoded in the instruction 300 also include a pair of GPRs, RS 304 and RA 306, and a number of bytes (NB) 308, if the above described alternative is used. The first GPR, RS 304, contains an index into the set of trace buffer registers indicating which one of trace engines 1-N, 200 to use. The second GPR, RA 306, indicates the GPR 106 where the data starts that should be written into a current trace entry 212 of the trace buffer 210, starting with the most significant bit (MSB) in the GPR. An extended op code of the APU trace instruction 300 is an extended op code of the instruction and field X 312 is not used.

In accordance with features of the preferred embodiment, advantages are that the APU trace instruction 300 can be executed at user level without having to switch into kernel context, as is usually the case with masking interrupts or suspending thread dispatching. Second, the data can be written into one trace buffer 210 from multiple execution contexts. This eliminates having to merge multiple trace buffers in post processing steps. The process of tracing is also simplified since code does not need to determine which trace buffer to write into based on the context it is running in. By holding the data in the GPRs, the data is saved automatically as part of the operating system's normal context switch process.

Figure 4A:
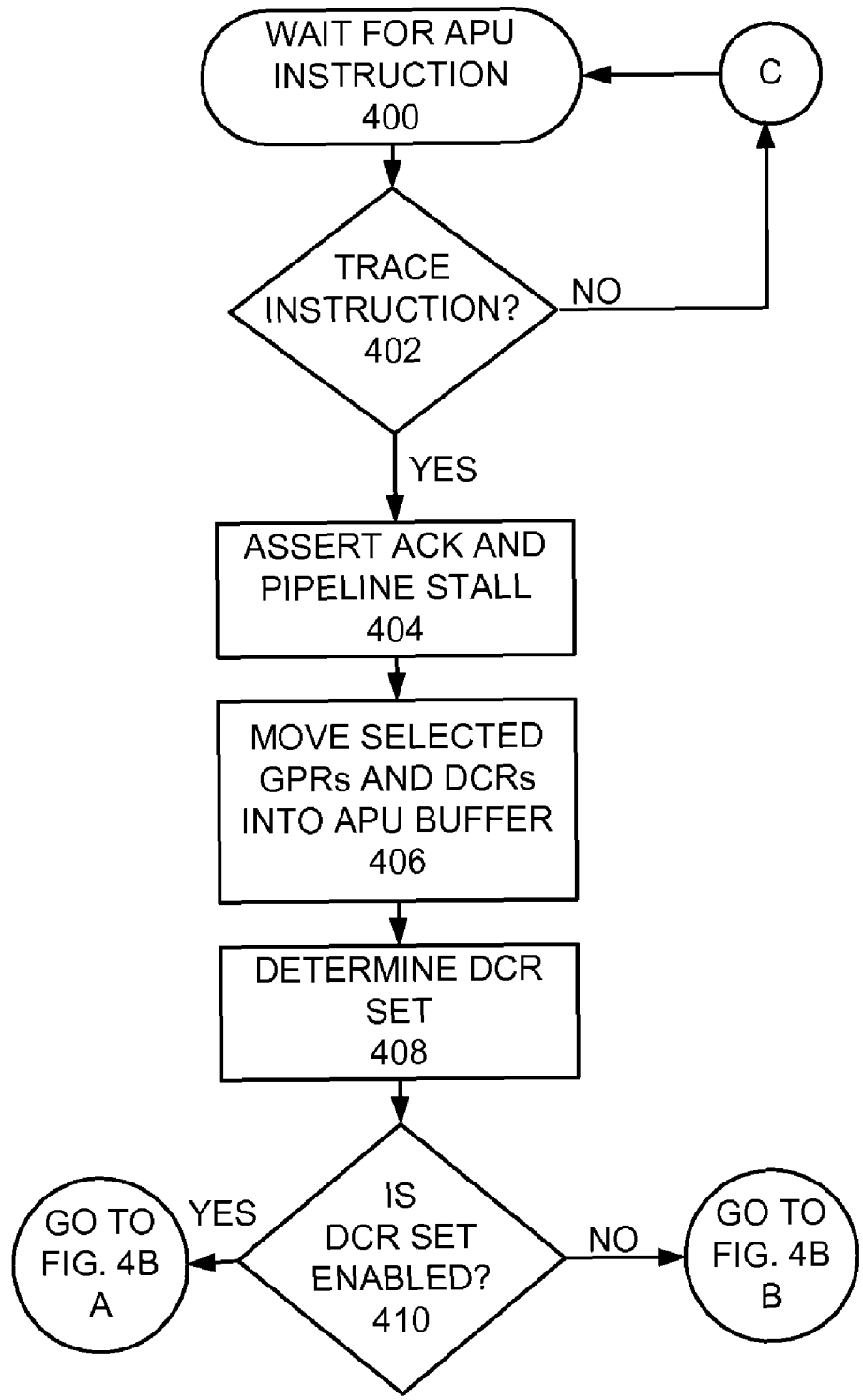
FIGS. 4A and 4B together provide a flow chart illustrating exemplary steps for implementing atomic data tracing in accordance with the preferred embodiment.
Figure 4B:
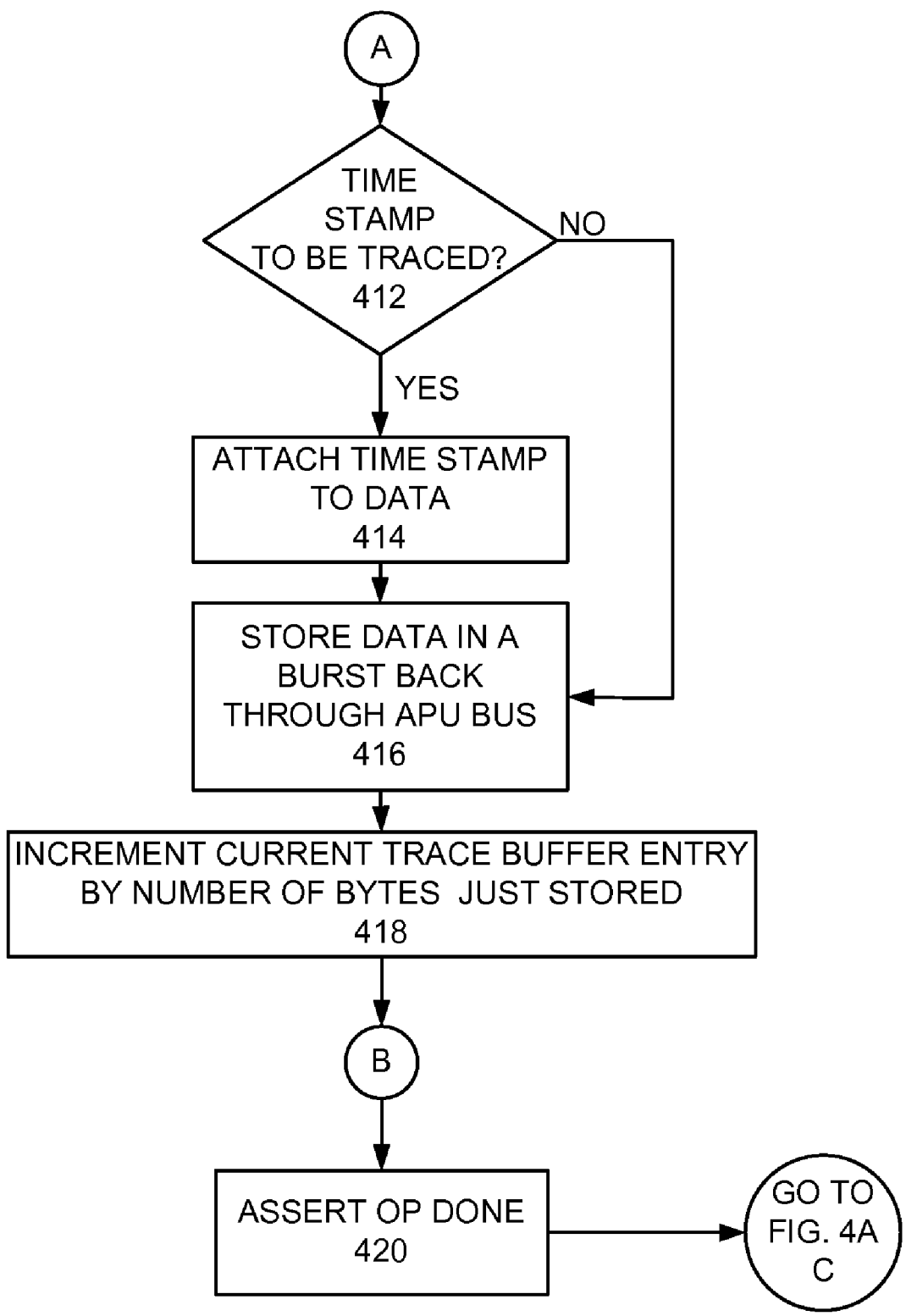

Referring now to FIGS. 4A and 4B, there are shown exemplary steps for implementing atomic data tracing in accordance with the preferred embodiment with the APU 102. When the CPU core 104 fetches an instruction and issues the instruction to execution unit 112, the instruction and some registers are also broadcast to the APU 102. The APU 102 waits for an instruction as indicated in a block 400. When an instruction arrives, checking is performed to determine if the instruction is an APU trace instruction 300 as indicated in a decision block 402. When the APU trace instruction 300 is identified, then the APU 102 signals the CPU 104 that this is a valid APU instruction through the acknowledge signal 118 and instructs the CPU to halt its instruction pipeline through the pipeline stall signal 120 as indicated in a block 404. Stalling the CPU instruction pipeline provides the atomic behavior needed by the trace instruction. The trace instruction is decoded and the data in the GPRs specified by the instruction is moved into buffers in the APU 102 as indicated in a block 406.

When the trace instruction is executed the set of DCRs containing information about the trace engine 200 specified in the APU trace instruction 300 is determined as indicated in a block 408. Next, the control register 206 for the particular trace engine 1-N, 200 is checked to determine if the trace engine is currently enabled as indicated in a decision block 410. If the control register 206 for the particular trace engine 200 indicates that this particular trace engine is enabled at decision block 410, then the process will continue to write the trace data into the trace log. This allows for tracing to be turned on and off on the fly. If enabled, then the sequential operations continue following entry point A in FIG. 4B. Otherwise, if the trace engine is not currently enabled, the sequential operations continue following entry point B in FIG. 4B. When the trace engine is not enabled when the control register 206 is checked at decision block 410, then the remainder of the instruction is a no-op with no updates to the trace buffer pointer register 202 occurring.

Referring to FIG. 4B following entry point B, the op done signal 122 is asserted to the CPU 104 allowing the CPU to continue with instruction processing as indicated in a block 420. Then the operations return to block 400 to wait for a next APU instruction at block 400.

Referring to FIG. 4B following entry point A, the control register 206 is checked to determine if a time stamp should be traced as indicated in a block 412. If so, the time stamp is written to the address pointed to by the offset for current entry 214 of the trace buffer pointer register 202 to attach the time stamp to the data as indicated in a block 414. Then the number of data bytes to write is determined, either from the NB 308 of the trace instruction 300 or field 226 of the control register 206. Starting at the MSB of the GPR indicated in the trace instruction 300, once all of the data is gathered in the APU buffer, it is stored back through the APU bus 116 in a burst to the address indicated in the current trace entry DCR as indicated in a block 416. The CPU 104 then performs the necessary transaction to store the data back into the D cache 128, or DRAM 136.

At block 416, the data is written into the trace buffer 210 starting at an offset the size of the time stamp from the current entry address 214 contained in the trace buffer pointer register 202, if the timestamp is traced. If the length of the data to be written is greater than the size of the register then the tracing continues with the next consecutive GPR and so on until all the data is written into the trace buffer 210. To control wrapping of this register once the end of the trace buffer is reached, bits in base address mask register 204 are used to indicate which bit in the trace buffer pointer register 202 are not effected by the add operation, for example one bits in the base address mask register 204 indicate bits not modified in the trace buffer pointer register 202, as indicated in FIG. 2. Once the data is completely written, the number of data bytes written plus the size of the time stamp, if the timestamp is traced, is added to the offset current entry address 214 in the trace buffer pointer register 202 as indicated in a block 418. At this point the instruction has completed, and the op done signal 122 is asserted to the CPU 104 allowing the CPU to continue with instruction processing as indicated in a block 420. Further instructions are then allowed to execute. Then the operations return following entry point C in FIG. 4A to block 400 to wait for a next APU instruction at block 400.

Figure 5:
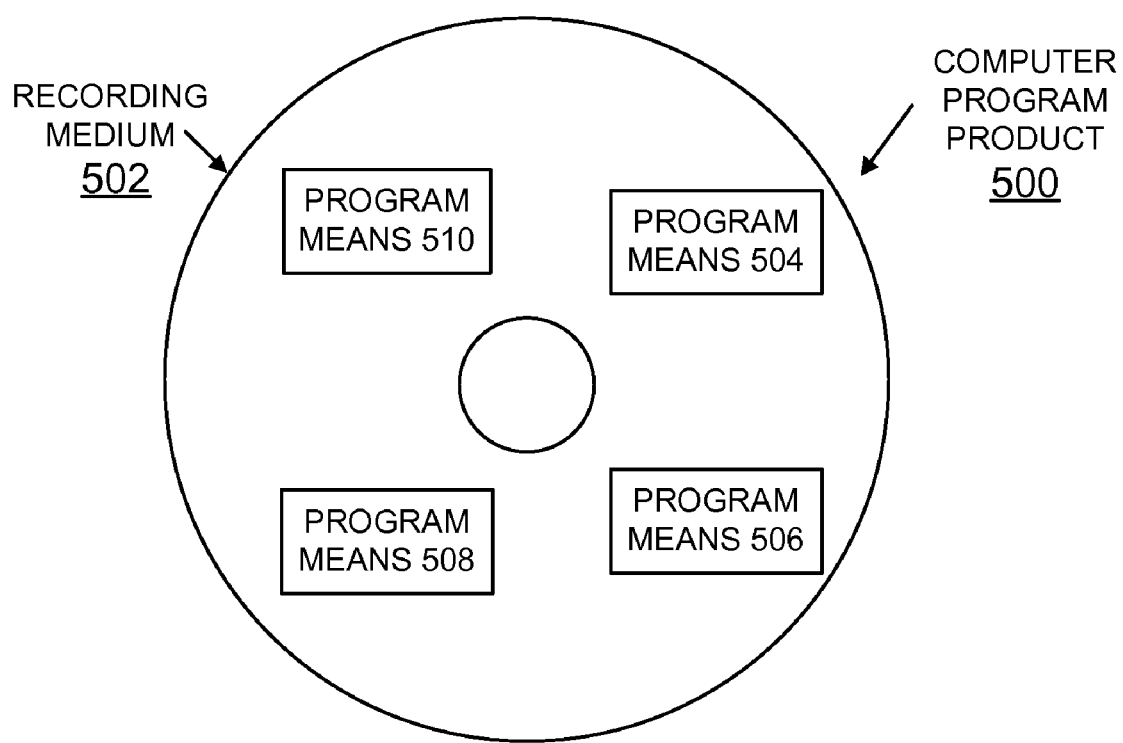
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing atomic data tracing of the preferred embodiment in the ASIC processor system 100 of FIG. 1.

A sequence of program instructions or a logical assembly of one or more interrelated modules defined by the recorded program means 504, 506, 508, 510, direct the processor system 100 for implementing atomic data tracing of the preferred embodiment.

While the present invention has been described with reference to the details of the embodiments of the invention shown in the drawing, these details are not intended to limit the scope of the invention as claimed in the appended claims.

What is claimed is:

1. An apparatus for implementing atomic data tracing in a processor system including an auxiliary processor unit (APU) coupled to a central processor unit (CPU), said apparatus comprising:

a trace engine; said trace engine including a set of device control registers (DCRs) accessible by the APU, and a single trace buffer; said set of device control registers (DCRs) including a trace buffer pointer register storing a base address of said trace buffer and an offset indicating a current trace buffer entry and including a base address mask register storing a mask indicating which bits in said trace buffer pointer register hold said base address and which hold said offset; said base address mask register used to determine a wrap point of said trace buffer;

a trace instruction; said trace instruction including a primary op code and encoded first and second general purpose registers (GPRs), said first GPR containing an index to said trace engine DCRs and said second GPR indicating a first GPR containing data to be written into a current trace entry in said trace buffer; said data to be written being saved automatically in at least one GPR including said first GPR during normal context switch processing;

the APU processes said trace instruction performing the steps of signaling the CPU with a pipeline stall signal for stalling a CPU instruction stream pipeline; responsive to identifying an enabled trace engine for said trace instruction, writing trace data into said single trace buffer utilizing said set of device control registers (DCRs) included in said single trace engine to determine where to write the data into said trace buffer and including writing trace data into said single trace buffer from multiple execution contexts; and signaling the CPU with an op done signal for allowing the CPU to continue with instruction stream pipeline processing.

2. The apparatus for implementing atomic data tracing in a processor system as recited in claim 1 wherein said set of device control registers (DCRs) include a control register storing an enabled bit indicating whether or not said trace engine for said trace instruction is enabled, said enabled bit being used for allowing data tracing to be turned on and off on the fly.

3. The apparatus for implementing atomic data tracing in a processor system as recited in claim 2 wherein the APU updates said offset to said current trace buffer entry of said trace buffer pointer register for each trace data entry written to said trace buffer.

4. The apparatus for implementing atomic data tracing in a processor system as recited in claim 2 wherein said control register includes a time stamp value indicating whether or not a time stamp should be traced; and the APU writes a time stamp with said trace data responsive to said control register time stamp value.

5. A computer program product for implementing atomic data tracing in a processor system including an auxiliary processor unit (APU) coupled to a central processor unit (CPU), said computer program product including instructions stored on a computer recording medium consisting one of a floppy disk, an optically read compact disk, a compact disk read only memory (CD-ROM), and a tape, wherein said instructions, when executed by the processor system to cause the processor system to perform the steps of:

defining a single trace buffer and a set of device control registers (DCRs) accessible by the APU to create a trace engine; said set of device control registers (DCRs) including a trace buffer pointer register for storing a base address of said trace buffer and an offset indicating a current trace buffer entry and including a base address mask register storing a mask indicating which bits in said trace buffer pointer register hold said base address and which hold said offset; said base address mask register used to determine a wrap point of said trace buffer;

providing a trace instruction; said trace instruction including a primary op code and encoded first and second general purpose registers (GPRs), said first GPR containing an index to said trace engine DCRs and said second GPR indicating a first GPR containing data to be written into a current trace entry in said trace buffer; said data to be written being saved automatically in at least one GPR including said first GPR during normal context switch processing; and utilizing the APU for processing said trace instruction by performing the steps of: signaling the CPU with a pipeline stall signal for stalling a CPU instruction stream pipeline; utilizing said set of DCRs, checking for an enabled trace engine for said trace instruction; and responsive to identifying an enabled trace engine for said trace instruction, writing trace data into said single trace buffer utilizing said set of device control registers (DCRs) included in said trace engine to determine where to write the data into said trace buffer including writing trace data into said single trace buffer from multiple execution contexts; and signaling the CPU with an op done signal for allowing the CPU to continue with instruction stream pipeline processing.

6. The computer program product for implementing atomic data tracing as recited in claim 5 wherein the step of defining a set of device control registers (DCRs) accessible by the APU to create a trace engine includes the steps of defining said set of DCRs including a control register storing an enabled bit indicating whether or not said trace engine for said trace instruction is enabled, said enabled bit being used for allowing data tracing to be turned on and off on the fly.

7. The computer program product for implementing atomic data tracing as recited in claim 6 wherein the step of writing trace data into said trace buffer includes updating said offset to said current trace buffer entry of said trace buffer pointer register for each trace data entry written to said trace buffer.

8. The computer program product for implementing atomic data tracing as recited in claim 6 wherein the step of writing trace data into said trace buffer includes checking a time stamp value in said control register indicating whether or not a time stamp should be traced; and the APU writes a time stamp with said trace data responsive to said control register time stamp value.

* * * * *